Jan. 19, 1937.  E. O. SEAVER  2,068,354
SEPARABLE FASTENER
Filed Sept. 2, 1933
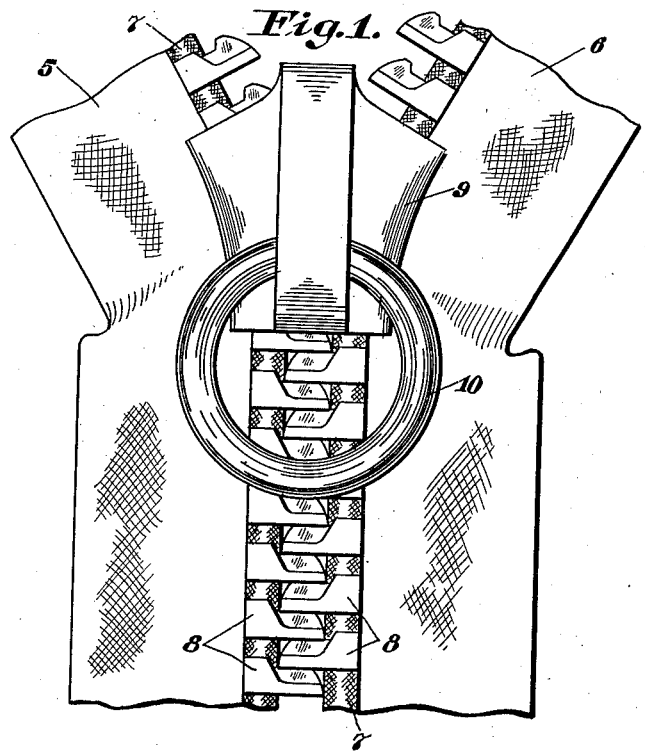
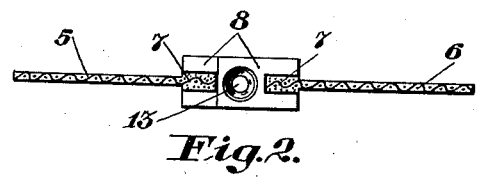
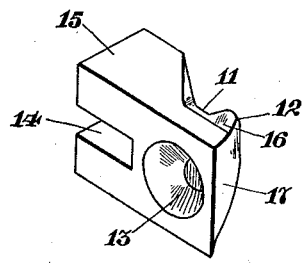
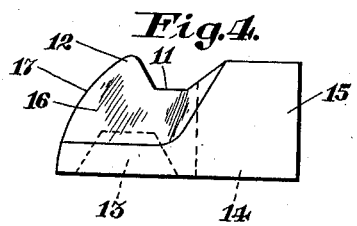
INVENTOR.
Elliot O. Seaver
BY Kelley & Chisholm
ATTORNEYS.

Patented Jan. 19, 1937

2,068,354

UNITED STATES PATENT OFFICE 2,068,354

SEPARABLE FASTENER

Elliot O. Seaver, Meadville, Pa., assignor to Hookless Fastener Company, a corporation of Pennsylvania Application September 2, 1933, Serial No. 687,989

2 Claims. (Cl. 24—205)

My invention relates to separable fasteners and has for its principal object to provide improvements in non-metallic fasteners wherein the fastener elements are secured in place by sticking.

One of the objects of the present invention is to provide a greater sticking surface for a given width of fastener chain.

Another object is to provide greater bearing surface for engagement with the slider.

A still further object is to produce the proper degree of flexibility of a fastener of this type.

Other objects and advantages will appear during the course of the following specification.

In the accompanying drawing I have shown for purposes of illustration one embodiment which my invention may assume in practice. In this drawing:

Fig. 1 is a plan view of a fastener illustrating my invention;

Fig. 2 is a cross-section;

Fig. 3 is a perspective view of the fastener element; and

Fig. 4 is a side view of a fastener element on an enlarged scale.

A fastener of the type in question comprises flexible members, herein fabric tapes 5, 6, preferably having beaded edges 7 to which are attached in uniformly spaced relation the fastener elements 8. The fastener elements are brought into engaging relation by a slider 9, which is actuated by a pull tab 10. The operation of this form of fastener is well-known and will not be further described.

Referring to the shape of the individual element it may be described as comprising a block member having a transversely extending notch 11 across one face. On the end at one side of the notch is formed an interlocking head with a tapered projection 12 and a recess 13 adapted to receive the projection of a similar member. On the opposite end a slot 14 is cut through the longitudinal central portion to provide tape contacting surfaces. The base portion is designated 15 and is of substantially the same length in the longitudinal direction of the stringer as the over-all width of the interlocking head including the projection. This provides the maximum degree of sticking surface without sacrificing flexibility to an objectionable degree. The sticking of the fastener members on the beaded edges 7 is accomplished by cementing, gluing or softening the surfaces of the members sufficiently to cause them to adhere to the fabric. This process is more fully described in the patent to Corner No. 1,920,138.

In carving out the projection on the interlocking head it is desirable to provide inclined side surfaces 16 and an inclined front surface 17 to make the fastener flexible and enable it to be opened and closed without jamming in the slider.

As a result of my invention it will be observed that a fastener has been devised which has numerous advantages, particularly when the fastener is made in non-metallic materials. If the fastener elements are colored there will be a more uniform band of color than with the base portions of the elements of the usual width. It will also be evident that a more nearly continuous track surface for the slider and greater holding power of the fastener elements on the tapes will result from my improved construction.

While I have shown and described in this application one embodiment which my invention may assume in practice, it will be understood that this embodiment is merely for the purposes of illustration and description and that various other forms may be devised within the scope of my invention as defined in the appended claims.

What I claim as my invention is:

1. A separable interlocking fastener comprising a pair of flexible stringers, fastener elements arranged along the adjacent edges of said stringers in uniformly spaced relation, said fastener elements each comprising a block-like member having a transversely extending notch dividing the block into a base portion and an interlocking portion, said interlocking portion having a projection on one side and a correspondingly shaped recess on the opposite side, said base portion and said interlocking portion including said projection being coextensive in a direction longitudinally of the fastener, said base portion being longitudinally slotted to receive the edge of the tape, the entire surfaces of said slot being adhesively secured to the tape.

2. A separable interlocking fastener comprising a pair of flexible stringers, fastener elements adhesively secured to said stringers in uniformly spaced relation, each fastener element comprising a block-like member having a transversely extending notch dividing the block into a base portion and an interlocking portion, said interlocking portion being further shaped to provide a single tapered projection constituting one wall of the notch and a correspondingly shaped recess centrally located on the side of the member opposite said projection, the resulting fastener element having a base portion and a head portion which are co-extensive in a direction longitudinally of the fastener.

ELLIOT O. SEAVER.